Jan. 3, 1956 J. J. KRAUS 2,728,976
METHOD OF MAKING FLANGED TUBE
Filed July 21, 1950 2 Sheets-Sheet 1
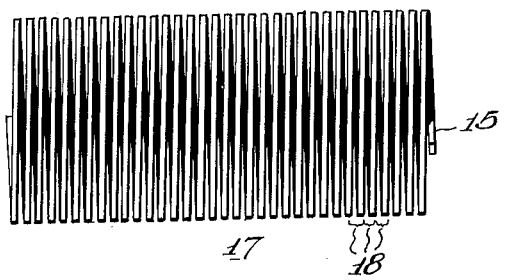
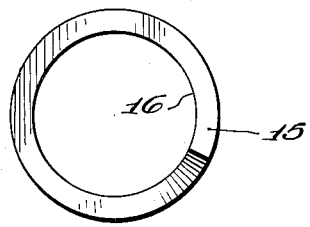
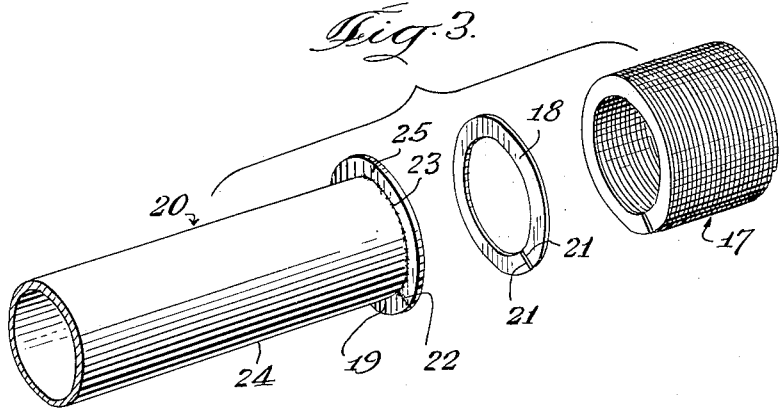
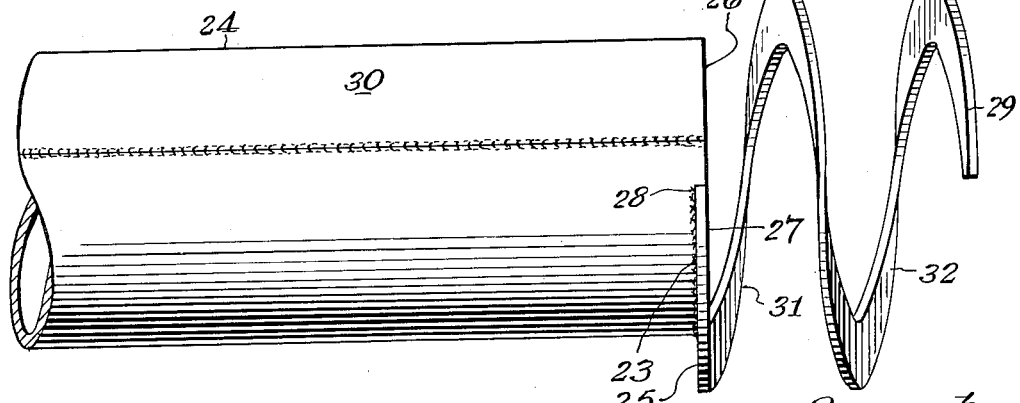
Inventor
James J. Kraus
By Soans, Glaister & Anderson
Attorneys

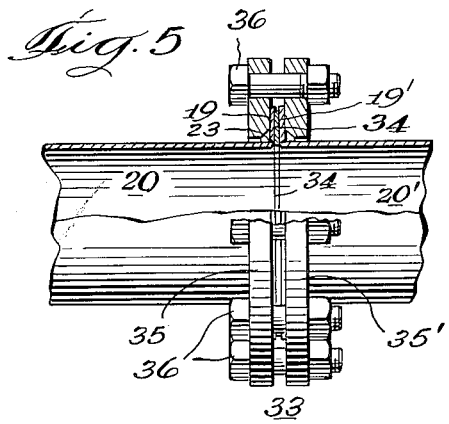
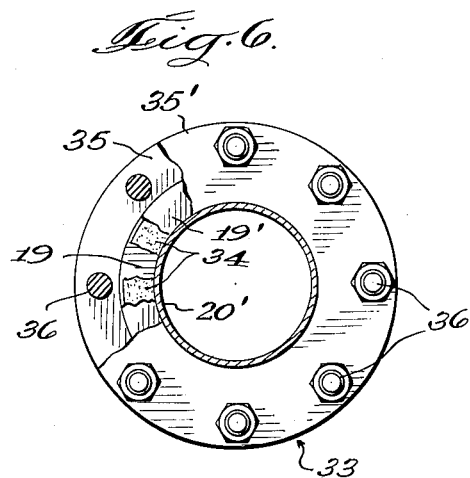
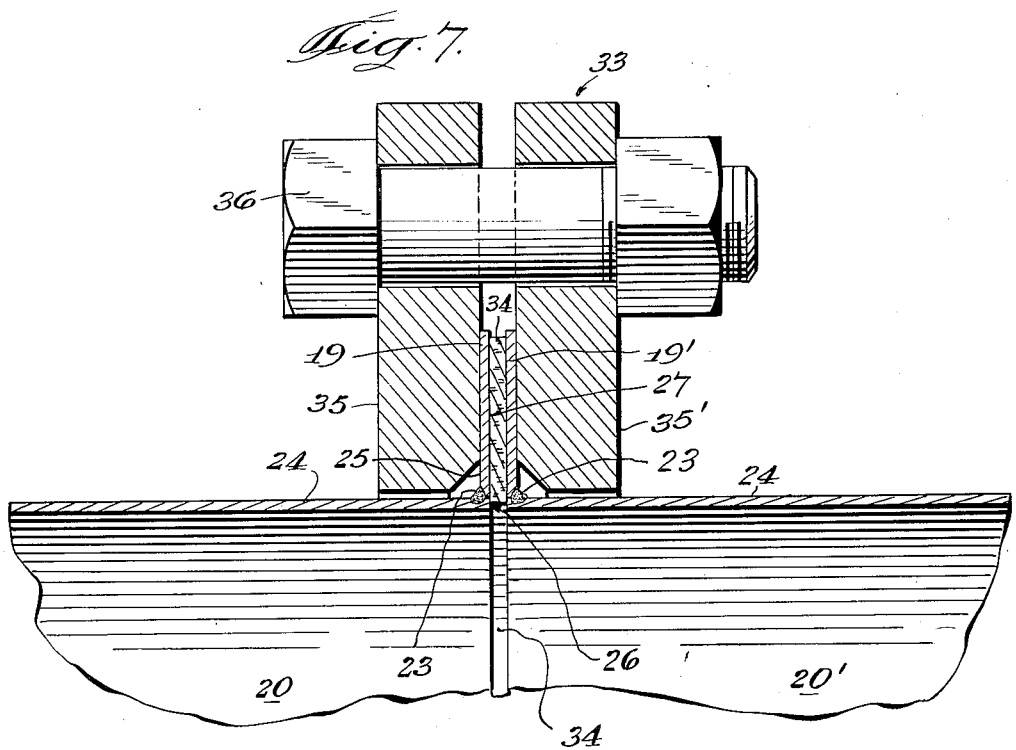

United States Patent Office 2,728,976
Patented Jan. 3, 1956

2,728,976

METHOD OF MAKING FLANGED TUBE

James J. Kraus, Neenah, Wis.

Application July 21, 1950, Serial No. 175,199

3 Claims. (Cl. 29—157)

This invention relates to the applying of flanges to tubing, and particularly to tubing having relatively thin walls.

In various industrial processes involving the handling of fluid materials, considerable amounts of tubing are frequently required for the conveying of these materials. Ordinarily, each installation is unique, in that it requires a conveying system of tubular conduit which is tailor-made to the particular installation, and most conduit systems require large numbers of joints and couplings. These couplings are, in fact, usually so numerous that a substantial portion of the cost of tubular conduit installations of this type resides in the joints and couplings.

Particularly is this true in those conduit systems which, because they are used for the handling of chemically active materials or for other reasons, are fabricated of corrosion-resistant metals or alloys, such as stainless steel or Monel metal. Because these metals and alloys are expensive, as compared with the more common structural materials, the walls of tubular conduit fabricated from such materials are generally made as thin as possible, consistent with the safety and pressure requirements of the system. As a matter of practice, stainless steel tubing in nominal sizes above about 4 inches in diameter is usually fabricated by rolling sheet or plate into tubular form and welding the abutting edges together in a longitudinal seam. This method of fabrication, the physical characteristics of various of the materials used, and the diverse coupling requirements of any particular conduit installation, all render it impracticable to form the coupling flanges integral with the tubing and necessitate the prefabrication of separate flanges or flange rings, which are adapted to be subsequently joined to the tubing.

Special-purpose couplings and coupling flanges are available commercially at substantial cost to suit unusual requirements, but in the interests of reducing cost, it is desirable that the greater number of flanges used shall comprise merely a simple ring which is formed of sheet or plate material of the approximate thickness of the tube wall and which is firmly attached to the tube, as by welding, brazing or silver soldering. In making a joint with these simple ring flanges, the flanged ends of adjacent tubes are abutted, generally with a resilient gasket between the flanges, and the flanges are securely clamped or bolted together.

The prevailing method of forming these flange rings involves cutting the rings in one piece from solid sheets of the fabricating material. Since these sheets are commercially available in rectangular form, it will at once be apparent that in so forming these flange rings, large portions of the sheet are unusable, the only recovery possible being in the case where smaller flange rings may be cut from the inner discs which remain after larger flange rings have been severed, and in the scrap value of the unusable material. In most installations, however, one particular size of tubing will predominate and little recovery of material can be made. As a concrete illustration, it was found that in a particular conduit system for the handling of pulp-treating liquors in the paper industry, a very considerable portion of the total cost of the conduit was attributable to the couplings and was, in substantial part, traceable to the inefficient fabrication methods which commonly prevail.

Accordingly, it is the principal object of this invention to provide an improved procedure for flanging tubing, and especially thin-walled tubing, which will not only effect economies of materials and labor in the fabrication of the flanges and joints, but which, in addition, will produce a better flanged joint than is possible by the prior procedures.

Other objects and advantages of the invention will appear and the invention will be understood by reference to the accompanying drawings and the following description of certain specific embodiments thereof.

In the drawings:

Figure 1 is a front elevational view of a series of interconnected flange rings in accordance with the invention prior to attachment to the tubing;

Figure 2 is an end elevational view of the flange ring series illustrated in Figure 1;

Figure 3 is a perspective view showing a flange ring before and after application to the tubing;

Figure 4 is a side elevational view of the end of a pipe of tubing illustrating an alternative manner of attaching the flange ring to the tubing;

Figure 5 is a side elevational view, partly in section, of one type of coupling which incorporates coupling flanges fabricated and applied to the tubing in accordance with the invention;

Figure 6 is an end elevation, partly in section, of the joint shown in Figure 5; and Figure 7 is an enlarged sectional view of a portion of the joint shown in Figure 5, which illustrates in greater detail the welded connection between the flange ring and the tube proper.

In the manufacture of flange connections and flange rings in accordance with the present invention, the first step consists in the fabrication of a relatively narrow strip of sheet metal or bar stock of any desired cross-section into an edgewise coil having an internal diameter which is approximately equal to the outside diameter of the tubing with which the connections are to be used. Usually this coil is made of the same metal as the tubing, but other metals capable of attachment to the tubing can be used. For example, as illustrated in Figure 1, a flat strip or bar 15 may be spirally coiled about one of its side edges 16 to provide a coil 17 which consists of a series of flange rings in connected helical form. The series or coil 17 may comprise any desired number of turns 18, or fractions thereof, and it is intended that the individual turns may be severed from the series for attachment to the tubing as coupling flanges 19 in a manner subsequently described. The number of turns or convolutions formed is not material to the invention, but it has been found from experience that about twenty turns is a convenient number for ease of handling. In the illustrated embodiment, the strip 15 is coiled in its own plane, with each transverse element of the strip 15 substantially perpendicular to the helix axis.

While for the sake of clarity in illustration the helical series 17 of Figure 1 has been shown partially extended, the pitch of the helix is preferably held to a minimum so that adjacent turns about one another is shown in Figure 3. When this minimum pitch procedure is followed and the strip 15 is maintained stress-free in the helical coil, the individual turns need be stressed only a relatively small amount to align the severed ends during the forming of the flange rings. If on the other hand, the strip is stressed in torsion a predetermined small amount as it is formed into a coil, the individual turns will lie flat after severance.

The strip 15 may be coiled as shown in Figures 1 and 2 by various known methods including bending and rolling, and may be heat-treated before or after it is coiled according to the nature and size of the material employed, the amount of curvature and the properties desired.

Depending upon the diameter of the tubing to which the flange rings are to be applied, and hence upon the variation of commercially available tubing from its nominal sizes, as will subsequently be explained, the individual flange rings 18 may be joined to the tube in either of two desirable ways. In the first procedure, illustrated in Figure 3, which is particularly adapted to the flanging of smaller sizes of tubing which are generally manufactured with small dimensional tolerances, individual turns or convolutions 18 may be severed from the helix prior to attachment to the tubing. In such case, a singe turn 18 may be slipped onto a tube 20 as a split ring and welded in place, the abutting ends 21 of the split ring being welded together at 22 in the same operation to form a complete flange 19 integral with the tube 20.

The pre-stressed coil type of ring series is especially suited for the practice of this method since it makes possible a flat ring, which is much easier to weld. The weld used may follow conventional practices, and may, for example, constitute a fillet 23 of weld material deposited between the outer surface 24 of the tube wall and the back face 25 of the flange, as shown in Figure 7. It is desirable that the front face 27 of the flange ring shall be flush with the end face 26 of the tube. In this way, the flange 19 is securely attached to the tube and re-enforced at its point of greatest stress. After welding, the face 27 of the flange ring and the end face 26 of the tube are ground smooth, this usually involving very light grinding.

As previously mentioned, the larger sizes of thin-wall tubing of stainless steel, Monel metal or other chemically-inert alloys, say above 4 inches in diameter, are ordinarily fabricated by rolling sheet into tubular form and then welding the abutting edges in a longitudinal seam. In tubing formed by this method, dimensional variations of plus or minus $\frac{1}{16}''$, or even more, based on the tube diameter, are commonly encountered. The flanging procedure of the present invention is particularly adapted for use with tubing of this type, because of the inherent capability of the invention to provide flange rings which may vary substantially in size.

When applying these rings to off-size tubing, the tubing can be accurately measured and the ring cut to proper length, or the procedure illustrated in Figure 4 can be followed. This consists in tack-welding one extremity 28 of a helically coiled strip 29 to a tube 30 and then tacking progressively more of the end convolution 31 of the strip 29 to the tube until the length of strip required to form the flange has been determined. It will be apparent that as more of the end convolution is tacked to the tube 30, the second convolution 32 from the end of the helix will tend to overlie the end convolution 31, and the point at which the extremity 28 of the strip 29 overlaps the beginning of the second convolution can be accurately determined. The end convolution 31 may then be severed from the remainder of the strip and welded to the tube in a continuous seam. In this manner, variations in the nominal diameter, and hence in the circumference of the tube 30, may be compensated for without the necessity of laboriously fitting each individual ring to the tube either by grinding out portions of the inner periphery of a fixed diameter ring or by filling excessive voids between the inner periphery of such a ring and the outer surface of the tube with weld material. The flange of the present invention in its partially-fabricated helical form is quite flexible and may be easily conformed to the surface of the tube without re-shaping or grinding, and with a minimum of time and effort. Moreover, the individual turns of the strip 29 may be separated a substantial distance apart, as indicated in Fig. 4, without exceeding the limit of torsional elasticity of the coiled strip, in order to permit the insertion of a tool for cutting off the flange ring.

The above-described method of flanging tubing is limited as to size of flange produced only by the ability of presently available machines to form the flange rings from strip or bar stock. While flanges up to one-half inch in thickness have been produced by the method herein disclosed, the invention is particularly adapted to the fabrication of thinner flanges for relatively thin walled tubing, and up to the present time the greatest economies have been realized in this field. As previously stated, these savings of time and material are of especial importance when the fabricating material is stainless steel or any of the other relatively expensive corrosion-resistant alloys.

A practical range of tubing sizes for handling substantial quantities of fluid in this specialized field is from about 4 inch diameter to 30 inch diameter (outer, or nominal diameter) with the thickness of the tube wall varying correspondingly from about 16 gauge to 11 gauge (American Standard Gauge), in accordance with particular strength requirements. Near the lower limit of the range of sizes, a flange width of one inch and a thickness of from 16 to 14 gauge has been found suitable to most applications, while near the upper limit of the range, the flange width may desirably be increased to approximately 2 inches and the flange thickness to approximately 11 gauge, these variations being controlled by design factors which include the type of joint desired, the clamping means selected, the pressure of the fluid materials handled, and other considerations.

A complete joint or coupling 33 utilizing right angle flanges which have been applied by the practice of the invention is illustrated in Figures 5, 6 and 7. In these figures, two co-axially aligned tubes 20 and 20' which are to be connected are provided respectively with end flanges 19 and 19' fabricated and joined to the tube as described above. A gasket 34 of resiliently deformable material is interposed between the flange faces and a pair of clamping rings 35 and 35' secured together by bolts 36 are provided to clamp the ends of the tubes together and to deform the gasket 34 to seal the joint. It will be understood that other means may be used for securing the flanges 35 and 35' together.

The invention has been described primarily in connection with its application to the more usual type coupling flanges, that is, to the ordinary flat, circular flange which is applied to the outer surface of a tube with which it is used at right angles to the longitudinal axis of that tube. It will be apparent, however, that the helix or the individual rings may be elliptical in outline or may be fabricated in some other geometric shape which would permit the flange rings so formed to be secured to a tube of cylindrical or other cross section at an oblique angle to the longitudinal axis of the tube. These and similar adaptations are within the scope of the present invention.

In the foregoing, there has been disclosed an improved procedure for applying flanges to tubing, especially tubing having relatively thin walls. Included is the disclosure of an improved procedure for forming flange rings and for applying rings formed by this procedure to tubing. As has been pointed out, the invention makes possible very marked reduction in the cost of fabricating flanged couplings, especially when metals or alloys such as stainless steel or Monel metal are to be used. In addition, by virtue of the inherent capabilities of the procedures of the invention to produce flange rings which are applicable to varying sizes of pipe and tubing, the invention makes possible much more satisfactory joints than can be attained by the older procedures. By pre-stressing the strip material which is fabricated into the edgewise coils, as previously described, it is possible to produce flange rings which will lie flat when cut. While particularly useful in connection with the manufacture of flat rings, the invention is also applicable to the manufacture of flanges and couplings of other shapes and configurations.

Various of the features of the invention believed to be new are set forth in the appended claims.

I claim:

1. The method of flanging thin-walled tubing formed from corrosion-resistant sheet metal and having a longitudinally extending welded seam, which comprises coiling a thin, flat strip of such metal edgewise to form a flexible helix the turns of which are resiliently separable, portions of said helically coiled strip approximating one turn of the helix being conformable along their inside edges to said tubing in a plane cutting the axis of the tubing, conforming such a portion of said strip to said tubing to determine the length thereof required to make a continuous flange in said plane, cutting off said length of strip, and welding said length of strip, with ends abutted and joined, to said tubing along said plane.

2. The method of flanging thin-walled tubing formed from corrosion-resistant sheet metal and having a longitudinally-extending welded seam, which comprises coiling a thin flat strip of such metal edgewise in the plane of said strip to form a flexible circular helix having a plurality of convolutions which are resiliently separable, the inner diameter of said helix being substantially equal to the outer diameter of said tubing wherefore portions thereof approximating one of said convolutions are conformable to said tubing in a plane perpendicular to the axis thereof, conforming such a portion of said strip to the outer surface of said tubing to determine the length thereof required to form a continuous ring flange in said plane, cutting off said length of strip, and welding said length of strip, with the ends abutted and joined, to said tubing along said plane.

3. The method of flanging thin-walled tubing formed from corrosion-resistant sheet metal and having a longitudinally-extending welded seam, which comprises coiling a thin, flat strip of such metal edgewise in the plane of the strip to form a flexible circular helix the turns of which are resiliently separable, the inner diameter of said helix being substantially equal to the outer diameter of said tubing wherefore portions of said tubing approximating one turn of the helix are conformable along their inside edges to the outer surface of said tubing in a plane perpendicular to the axis thereof, progressively welding a portion of an end turn of said helix to said tubing along said plane to conform said portion to said tubing and to determine the length of said strip required for a continuous flange in said plane, severing said length from said helix, aligning the extremities of said severed length of strip, and welding the remainder of said severed length of strip to said tubing.

References Cited in the file of this patent

UNITED STATES PATENTS

| 1,107,005 | White | Aug. 11, 1914 |
| 2,442,446 | Wallace | June 1, 1948 |

FOREIGN PATENTS

| 434,495 | Germany | Sept. 23, 1926 |